Patented July 21, 1953

2,645,818

UNITED STATES PATENT OFFICE 2,645,818

METHOD OF MAKING RETRACTILE ARTICLES

Nicolas Drisch and René Fays, Paris, France, assignors, by mesne assignments, to Societe Novacel, Paris, France, a corporation of France No Drawing. Application July 31, 1947, Serial No. 765,254. In France May 3, 1945

6 Claims. (Cl. 18—58.7)

This invention relates to a method of making retractile articles. More particularly, it relates to making retractile articles, such as caps, bands and the like, formed of polymerized vinyl derivatives.

Retractile articles, such as caps, bands, etc., formed of polymerized vinyl derivatives have been prepared by coagulating with water a solution comprising a water-insoluble polymerized vinyl derivative dissolved in a water-miscible organic solvent and adhering to an appropriate mold which was dipped in said solution. In another procedure, an appropriately shaped chilled mold was dipped into a hot solution capable of gelling on cooling and comprising a water-insoluble resin in a water-miscible solvent and, after withdrawal of the mold, the adhering gel was washed with water to remove the solvent. In both of the procedures the water treatments were carried out so as to obtain aqueous solutions containing as high a concentration of solvent as possible in order to facilitate the recovery of the solvent.

The products resulting from the aforesaid procedures were aqueous gels more or less rich in water and had the property of shrinking upon conversion from a wet or gel state to the dry state, and firmly adhering to the article on which they had been applied. Such articles, and particularly caps and bands, have been used to a great extent on bottle closures or on bottle necks. According to the prior art, the article, such as a cap or band, while in the wet, moist or slightly swollen state, was applied to the desired article as, for example, over the closure or on the neck of the bottle, and converted to the dry state. Upon drying, the cap or band shrank or contracted, with the result that it tightly gripped the article to which it had been applied and also conformed to the shape thereof.

According to the prior art procedures, due to the fact that the gel cap was oversize and was freely disposed in its desired position, a certain degree of drying was necessary for the cap to begin to grip the neck so as to cause it to adhere sufficiently and permit manipulation of the capped article. This required preliminary drying before manipulating the capped article was a disadvantage for certain uses where a large number of articles had to be handled rapidly. Rapid driers for caps have been utilized, but such driers were expensive and offered only partial solution of the difficulties. Consequently, the difficulties and disadvantages just mentioned greatly restricted the market for said caps.

In order to overcome the above-mentioned inconvenience, it has also been proposed to stretch the gel caps by means of stretching devices which, after the caps have been positioned in place, were withdrawn. The retractile articles in the gel state, prepared by the previously mentioned processes, showed variable mechanical resistance depnding on the nature of the polyvinyl derivative and the water content thereof. In general, such retractile articles had a high elongation and a low elasticity. Additionally, when they were stretched by stretching means, they underwent certain distortions beyond a certain limit, which was rapidly reached, and such distortions become permanent.

An object of this invention is to provide retractile articles, such as caps, bands, etc., formed of polyvinyl resins and having such elongation, plasticity and elasticity so that they can be stretched and mounted in position on articles of varying and different sizes, and immediately adhere sufficiently tightly and conform to the article to permit immediate handling of the article to which the retractile article is applied.

Another object of this invention is to provide a method of manufacturing retractile articles, such as caps, bands, etc., of polyvinyl resins having improved elongation and elasticity.

Other and additional objects will become apparent hereinafter.

For purposes of convenience and brevity, the invention will be described specifically in connection with caps, though it is to be understood that the invention is not restricted thereto and is equally applicable to all types of retractile articles.

The objects of the invention are accomplished, in general, by incorporating into a gel retractile article formed of a water-insoluble polyvinyl resin at some stage during the manufacture thereof a substance which imparts a high elongation and elasticity to the gel article and (1) is miscible with water in large proportions, (2) swells or gels the vinyl resin, and (3) is sufficiently volatile to be wholly or at least to a large extent eliminated during the drying, or else be wholly or partly carried along with the water of the gel during the drying.

The gel cap can be produced by immersing a mold in a solution of the selected vinyl resin in a water-soluble solvent and subjecting the layer of the solution which adheres to the mold upon withdrawal of the latter from the solution to a coagulating bath containing water. Alternatively, the gel cap can be obtained by dipping an appropriately shaped chilled mold into a hot solution of the vinyl resin, which solution is capable of gelling on cooling and, after withdrawal of the mold, removing the solvent from the adhering gel.

In the preferred embodiment of the invention, a cap formed of the selected vinyl resin and while in the gel state is treated with an aqueous solution of the elasticity-imparting substance, and thereafter the cap is maintained in the gel state, such as by being stored in water or packaged in impermeable containers, until said article is positioned in place in the ultimate use thereof. Alternatively, the molding solution on the mold can be treated with an aqueous solution of the elasticity-imparting agent, whereby the cap will be simultaneously coagulated and rendered elastic,.

The preferred polyvinyl resins are the polyvinyl alcohol-aldehyde condensation products generally termed "acetals," of which polyvinyl formal, polyvinyl acetal, and polyvinyl butyral are illustrative examples. Other polyvinyl resins, such as polymerized vinyl acetate and copolymers of vinyl acetate and vinyl chloride, can also be used.

Derivatives of polyhydric alcohols, and particularly derivatives of glycols and glycerols, may be mentioned as substances which will impart the desired properties of plasticity, elasticity, extensibility, etc. to caps formed of polyvinyl resins.

As derivatives of glycols which have given satisfactory results may be mentioned those having the following general formula:

wherein:

X is a radical of glycol;
R is a radical of a lower fatty acid or a halogen;
R' is a hydroxyl group, a radical of a lower fatty acid, or an alkoxyl radical containing 1 to 2 C atoms.

As derivatives of glycerols which have given satisfactory results may be mentioned those having the following general formula:

wherein:

Y is a radical of glycerol;
$R^2$ is a radical of a lower fatty acid or a halogen;
$R^3$ is a hydroxyl group, a radical of a lower fatty acid, or an alkoxyl radical containing 1 to 2 C atoms;
$R^4$ is a hydroxyl group, a radical of a lower fatty acid, or an alkoxyl radical containing 1 to 2 C atoms.

As illustrative specific examples of derivatives of glycols which have given satisfactory results may be mentioned monoformate of glycol, monoacetate of glycol, diacetate of glycol, and monochlorhydrin of glycol. As specific illustrative examples of derivatives of glycerols which have given satisfactory results may be mentioned glycerol monoacetate, glycerol diacetate, glycerol triacetate, and glycerol monochlorhydrin.

It is to be understood that one or a plurality of the glycol derivatives or one or a plurality of the glycerol derivatives, or combinations of both the derivatives of glycol and the derivatives of glycerol, may be used.

It is further to be noted that the plasticizing solutions are neutral and thus do not impart any undesirable properties to products treated therewith.

By means of a judicious choice of proportions, a choice that can be made by any one skilled in the art, caps are obtained which possess elastic elongation in all directions up to 500% in the moist state, and can be mounted, by virtue of said property, on bottle necks of many different dimensions by merely stretching them by means of appropriate apparatus. Immediately after having been placed in position, the caps contract to take on the shape of the necks or articles.

Caps prepared according to this invention do not immediately contract fully. Full contraction is produced and obtained only upon complete drying. However, on stretching and placing the caps in position, they grip the article sufficiently to allow the latter to be handled without any trouble, for example for the purpose of wrapping.

During the drying process, both the water and the incorporated elasticity-producing substance are eliminated, and the cap loses its extensibility and cannot be removed from the neck of the bottle without being damaged, which prevents its being tampered with.

Another advantage offered by the present invention is the possibility of applying caps of given dimensions to closures of bottles of various dimensions in much greater proportion than is possible with ordinary caps. This permits a reduction of the number of sizes that the manufacturer must have in stock. The result of this is a great simplification in manufacturing and the necessary material, a reduction in the cost price, and greater convenience for the user.

In order to more clearly explain the instant invention, there are hereafter set forth several specific embodiments of the invention, it being understood that the invention is not restricted thereto. In the examples, the proportions are parts by weight.

*Example I*

In a solution of the selected polyvinyl resin in an appropriate solvent, there is immersed an appropriate glass mold on which a layer of the solution adheres upon withdrawal of the mold from the solution. The adhering layer of the solution, while still on the mold, is then coagulated in the usual manner, as by immersion in water or an aqueous bath. After complete coagulation, the cap is removed from the mold and thoroughly washed to remove the solvent. Thereafter, the cap is impregnated, while still in the gel state, in a solution consisting of 10 to 15 parts of diacetate of glycol dissolved in 100 parts of water. The surface moisture is removed, and the gel cap is packaged in impermeable containers.

*Example II*

Same as Example I, except that a solution consisting of 15 to 30 parts of diacetin of glycerin in 100 parts of water is used.

*Example III*

An appropriately shaped mold is immersed into a solution of the selected polyvinyl resin in a water-soluble solvent. Upon withdrawal of the mold, it, together with the adhering layer of solution thereon, is immersed in a 10% to 15% aqueous solution of diacetate of glycol, which solution is renewed until the solvent of the molding solution has been eliminated. The cap is then removed from the mold, and, after removing the surface moisture, is packaged in the gel state in impermeable containers.

*Example IV*

A chilled mold is dipped into a hot solution of a polyvinyl resin in a water-soluble solvent, such solution being capable of forming a gel upon cooling. After withdrawal of the mold, the gel, while on the mold, is immersed in a bath consisting of a 15% to 30% aqueous solution of diacetin of glycerin, the solution being renewed until complete elimination of the solvent of the molding solution has been removed. The surface moisture on the cap is then removed, and the cap is packed in the gel state in impermeable boxes.

The polyvinyl resin molding solution is obtained by dissolving the selected polyvinyl resin in any well-known solvent for the resin and which preferably is also miscible with water in large proportions. The molding solution can also contain fillers, coloring agents, plasticizers, etc.

Since it is obvious that many changes and modifications can be made in the above-described details without departing from the nature and spirit of the invention, it is to be understood that the invention is not to be limited thereto except as set forth in the appended claims.

We claim:

1. A method of making retractile articles, such as caps and bands for ultimate conforming attachment to objects, and having sufficient elasticity and extensibility while in the moist or gel state to permit stretching thereof and the automatic return to a contracted state upon release of the stretching force, which comprises impregnating a gel retractile article formed of a water-insoluble polyvinyl acetal, with an aqueous solution containing an elasticity imparting agent which is sufficiently volatile to be eliminated during the drying of said article and which is selected from the group consisting of derivatives of glycols and glycerols of the following formulae—

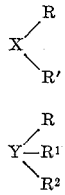

and wherein X is a radical of glycol, Y is a radical of glycerol, R is a radical of a lower fatty acid or a halogen, R' is a hydroxyl group, a radical of a lower fatty acid, or an alkoxyl radical containing 1 to 2 C atoms and R² is a hydroxyl group, a radical of a lower fatty acid, or an alkoxyl radical containing 1 to 2 C atoms, maintaining said article in the moist or gel state until it is to be applied to said object, stretching said article while still in the moist or gel state, applying the thus stretched article to said object, withdrawing the stretching force to allow said article to conform to said object and drying said article while on said object.

2. A method of setting up in retractile articles, such as caps and bands, sufficient elasticity and extensibility while in the moist or gel state to permit stretching thereof and the automatic return to a contracted state upon release of the stretching force, which comprises impregnating a gel retractile article formed of a water-insoluble polyvinyl acetal with an aqueous solution containing 10 to 15 parts of glycol, diacetate, and maintaining said article in the moist or gel state until it is positioned in place in the ultimate use thereof.

3. A method of setting up in retractile articles, such as caps and bands, sufficient elasticity and extensibility while in the moist or gel state to permit stretching thereof and the automatic return to a contracted state upon release of the stretching force, which comprises impregnating a gel retractile article formed of a water-insoluble polyvinyl acetal with an aqueous solution containing 15 to 30 parts of diacetin of glycerin, and maintaining said article in the moist or gel state until it is positioned in place in the ultimate use thereof.

4. A method of making retractile articles, such as caps and bands for ultimate conforming attachment to objects, and having sufficient elasticity and extensibility while in the moist or gel state to permit stretching thereof and the automatic return to a contracted state upon release of the stretching force, which comprises immersing a mold into a solution of a water-insoluble polyvinyl acetal, in a water-miscible solvent which is a swelling agent for said resin and is sufficiently volatile to be eliminated during drying of said article in its ultimate use, withdrawing said mold from said solution, immersing the adhering layer of the molding solution while on said mold in an aqueous solution containing a member selected from the group consisting of derivatives of glycols and glycerols of the following formulae—

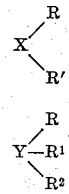

and wherein X is a radical of glycol, Y is a radical of glycerol, R is a radical of a lower fatty acid or a halogen, R' is a hydroxyl group, a radical of a lower fatty acid, or an alkoxyl radical containing 1 to 2 C atoms, and R² is a hydroxyl group, a radical of a lower fatty acid, or an alkoxy radical containing 1 to 2 C atoms, and maintaining the article in the moist or gel state until it is to be applied to said object, stretching said article while still in the moist or gel state, applying the thus stretched article to said object, withdrawing the stretching force to allow said article to conform to said object and drying said article while on said object.

5. A method of setting up in retractile articles, such as caps and bands, sufficient elasticity and extensibility while in the moist or gel state to permit stretching thereof and the automatic return to a contracted state upon release of the stretching force, which comprises immersing a mold into a solution of a water-insoluble polyvinyl acetal in a water-miscible solvent which is a swelling agent for said resin and sufficiently volatile to be eliminated during drying of said article in its ultimate use, withdrawing said mold from said solution, immersing the adhering layer of the molding solution while on said mold in an aqueous solution containing 10% to 15% by weight of diacetate of glycol, and maintaining said article in the moist or gel state until it is positioned in place in the ultimate use thereof.

6. A method of setting up in retractile articles, such as caps and bands, sufficient elasticity and extensibility while in the moist or gel state to permit stretching thereof and the automatic return to a contracted state upon release of the stretching force, which comprises immersing a chilled mold into a hot solution of a water-insoluble polyvinyl acetal in a water-soluble solvent which is a swelling agent for said resin and sufficiently volatile to be eliminated during drying of said article in its ultimate use, said solution forming a gel on cooling, immersing the gel structure while on said mold into an aqueous bath containing 15% to 30% of diacetin of glycerin, and maintaining said article in the moist or gel state until it is positioned in place in the ultimate use thereof.

NICOLAS DRISCH.
RENÉ FAYS.

References Cited in the file of this patent

UNITED STATES PATENTS

| Number | Name | Date |
|---|---|---|
| 2,112,717 | Snyder | Mar. 29, 1938 |
| 2,161,561 | Dalton | June 6, 1939 |
| 2,184,443 | Smith | Dec. 26, 1939 |
| 2,236,552 | Ushakoff | Apr. 1, 1941 |
| 2,338,787 | Ushakoff | Jan. 11, 1944 |
| 2,428,527 | Plumb | Oct. 7, 1947 |

FOREIGN PATENTS

| Number | Country | Date |
|---|---|---|
| 468,762 | Great Britain | July 12, 1937 |
| 843,823 | France | July 11, 1939 |